(12) United States Patent
Shin et al.

(10) Patent No.: US 8,632,924 B2
(45) Date of Patent: Jan. 21, 2014

(54) SOLID OXIDE FUEL CELLS AND MANUFACTURING METHOD THEREOF

(75) Inventors: Hyo Soon Shin, Gyeonggi-do (KR); Dong-Hun Yeo, Seoul (KR); Youn-Woo Hong, Daegu (KR); Jong Hee Kim, Seoul (KR); Sang Ok Yoon, Gangwaon-do (KR)

(73) Assignee: Korea Institute of Ceramic Engineering & Technology, Seoul (KR)

( * ) Notice: Subject to any disclaimer, the term of this patent is extended or adjusted under 35 U.S.C. 154(b) by 565 days.

(21) Appl. No.: 12/923,909

(22) Filed: Oct. 13, 2010

(65) Prior Publication Data

US 2012/0094206 A1 Apr. 19, 2012

(51) Int. Cl.
*H01M 8/10* (2006.01)
*H01M 8/00* (2006.01)

(52) U.S. Cl.
USPC ........... 429/481; 429/405; 429/465; 429/467; 429/471; 429/529; 429/532; 429/535

(58) Field of Classification Search
USPC ......... 429/405, 465, 467, 471, 481, 529, 532, 429/535
See application file for complete search history.

(56) References Cited

U.S. PATENT DOCUMENTS

| 5,273,837 | A | * | 12/1993 | Aitken et al. | 429/496 |
| 5,350,641 | A | * | 9/1994 | Mogensen et al. | 429/488 |
| 5,770,327 | A | * | 6/1998 | Barnett et al. | 429/460 |
| 6,372,375 | B1 | * | 4/2002 | Lawless | 429/486 |
| 6,551,735 | B2 | * | 4/2003 | Badding et al. | 429/486 |
| 7,220,506 | B2 | * | 5/2007 | Cochran et al. | 429/508 |

* cited by examiner

*Primary Examiner* — Ula C Ruddock
*Assistant Examiner* — Amanda Barrow
(74) *Attorney, Agent, or Firm* — Louis Woo

(57) ABSTRACT

Provided are a solid oxide fuel cell and a method of manufacturing the same. The solid oxide fuel cell in which at least one or more unit modules are stacked and integrated with each other includes first and second solid electrolyte layers in which each of the unit modules includes a plurality of fuel electrodes spaced a predetermined distance from each other and each having a strip shape and first and second supports each including a plurality of slits each having the same strip shape as that of each of the fuel electrodes. The first and second solid electrolyte layers overlap with each other on lower and upper sides of the first support so that the fuel electrodes face each other within the slits of the first support, and the second support overlaps with a lower side of the first or second solid electrolyte layer overlapping with the lower side of the first support so that the slits of the second support are disposed perpendicular to the slits of the first support. The slits of the first and second supports define fuel paths and air paths, respectively.

19 Claims, 10 Drawing Sheets

PRIOR ART

SOLID OXIDE FUEL CELLS AND MANUFACTURING METHOD THEREOF

BACKGROUND

The present disclosure relates to solid oxide fuel cells, and more particularly, to solid oxide fuel cells constituted by an integrated multi-layer structure type module.

Also, the present disclosure relates to a method of manufacturing the solid oxide fuel cells.

Fuel cells are devices that directly convert chemical energies of reactants such as fuel and oxidant into direct current (DC) electricity. Generally, various fuel cells such as a polymer electrolyte fuel cell (PEFC), a phosphoric acid fuel cell (PAFC), a molten carbonate fuel cell (MCFC), a solid oxide fuel cell (SOFC), and an enzymatic fuel cell are used in fuel cell fields.

Specifically, since the SOFC is operated at a high temperature of about 600° C. to about 1,000° C. to directly convert a hydrocarbon fuel into electricity, the SOFC has the highest energy conversion efficiency among fuel cells developed up to date. Typically, the SOFC includes a solid electrolyte having ionic conductivity with respect to oxygen ions and proton, a porous air electrode or an air electrode (or cathode) disposed on one side of the solid electrolyte, and a fuel electrode or an anode disposed on the other side of the solid electrolyte. Thus, oxygen gas or air containing oxygen is supplied into the air electrode, and a fuel gas containing hydrogen and hydrocarbon gas is supplied into the fuel electrode. As a result, a reduction reaction of oxygen occurs in the air electrode to generate oxygen ions. Then, the oxygen ions are moved into the fuel electrode through the solid electrolyte to generate water by reacting with the supplied hydrogen. Here, since electrons are generated in the fuel electrode and the electrons are consumed in the air electrode, electricity may be generated when the fuel electrode and the air electrode are connected to each other.

The SOFC may be largely divided into two kinds. One is a cylindrical type fuel cell in which an electrode and a solid electrolyte cover the circumference of a cylinder, and the other one is a flat plate type fuel cell in which a solid electrolyte and an electrode have flat shapes, respectively. Specifically, since the flat plate type fuel cell has a structure in which it is advantageous to increase a power density per unit volume through a high density thereof even though it is difficult to assemble the fuel cell, the flat plate type fuel cell may be advantageously used as a household or vehicle power source.

FIG. 1 is a schematic perspective view of a general flat type solid oxide fuel cell (SOFC) 1. Referring to FIG. 1, as described below in detail, the flat type solid oxide fuel cell 1 has a structure in which a plurality of connection members 4, each having a plurality of fuel paths 2 and air paths 3 on bottom and top surfaces thereof, is stacked. Also, an electrolyte layer 7 including a fuel electrode 5 on a top surface thereof and an air electrode 6 on a bottom surface thereof is inserted between the connection members 4. Also, a sealing member 8 is inserted into edges between the electrolyte layer 7 and the connection member 4.

In more detail, according to a general flat plate type SOFC 1, the plurality of fuel paths 2 through which fuel flows is disposed in the bottom surface of the connection member 4, and the plurality of air paths 3, which extend in a direction perpendicular to those of the fuel paths 2 to allow air to flow therethrough is disposed in the top surface. In addition, each of the fuel paths 2 and each of the air paths 3 have straight line groove shapes between wall parts 9, respectively. Also, when the plurality of connection members 4 is stacked, the electrolyte layer 7 including the fuel electrode 5 disposed on the top surface and the air electrode 6 disposed on the bottom surface is inserted between the connection members 4. Also, a sealing member 8 is inserted into the edges between the electrolyte layer 7 and the connection member 4. As described above, the electrolyte layer 7 including the fuel electrode 5 on the top surface that is one side thereof and the air electrode 6 on the bottom surface that is the other side thereof, the connection member 4 stacked so that the fuel paths 2 are disposed facing the fuel electrode 5 above the electrolyte layer 7, and the other connection member 4 stacked so that the air paths 3 are disposed facing the air electrode 6 below the electrolyte layer 7 are coupled to each other to constitute unit cells that are basic elements of the flat plate type SOGC 1. Actually, the plurality of unit cells that are the basic elements is stacked to complete the flat plate type SOFC 1.

Fuel gas and air are introduced through the fuel paths 2 and air paths 3 of each of the connection members 4, which are formed by each of the wall parts 9, to reach two electrode layers, i.e., the fuel electrode 5 and the air electrode 6. The fuel electrode 5 and the air electrode 6, which are the electrode layers have porous structures to easily cause an electrochemical reaction, respectively. Also, the electrolyte layer 7 has a dense structure to prevent the fuel gas and air from being ventilated with each other. Also, the sealing member 8 includes a sealing glass and seals the paths, which are respectively disposed on both surfaces of the connection material 4, to prevent the two kinds of gas from being mixed with each other. Such a flat plate type SOFC-related art is disclosed in Japanese Patent Laid-open Publication Nos. 2007-200710 and 2007-317594, U.S. Pat. Nos. 6,265,095, 6,183,897, and 4,997,726, and Europe Patent Laid-open Publication Nos. 2019443 and 993059.

In the flat plate type SOFC 1, the gases should be smoothly supplied into the two electrode layers, i.e., the fuel electrode 5 and the air electrode 6. Also, an insulation layer or plate formed of a material having sealing and insulating properties should be inserted into the remnant portion of the connection member 4, which does not contact the unit cells. However, since various components formed of materials different from each other are used to form a stacked structure of the related art SOFC, it may be difficult to secure reliability due to various factors such as a thermal expansion difference according to a high-temperature operation, oxidation, corrosion, and deterioration. Therefore, there is a limitation that the cells do not have a long life.

SUMMARY

The present disclosure provides a solid oxide fuel cell, which is constituted by an integrated multi-layered structure-type module to significantly improve a capacity per unit volume and life-cycle and reliability by solving limitations such as a thermal expansion difference between elements and oxidation of the elements, and a method of manufacturing the same.

In accordance with an exemplary embodiment, a solid oxide fuel cell in which at least one or more predetermined unit modules are stacked and integrated with each other includes: first and second solid electrolyte layers in which each of the unit modules includes a plurality of fuel electrodes spaced a predetermined distance from each other and each having a strip shape on a surface thereof; and first and second supports each including a plurality of slits each having the same strip shape as that of each of the fuel electrodes, wherein the first and second solid electrolyte layers overlap with each other on lower and upper sides of the first support to allow the plurality of fuel electrodes to face each other within the plurality of slits of the first support, and the second support overlaps with a lower side of the first or second solid electrolyte layer overlapping with the lower side of the first support to allow the slits of the second support to be disposed perpendicular to the slits of the first support, wherein the slits of the first support define fuel paths including the fuel electrodes, and the slits of the second support define air paths including air electrodes.

In accordance with another exemplary embodiment, a method of manufacturing a solid oxide fuel cell includes: respectively preparing first and second solid electrolyte tapes in which a plurality of fuel electrodes each having a strip shape is formed on a surface thereof; respectively preparing first and second supports each including a plurality of silts having end edges and side edges, each vertically communicating in parallel at distances spaced from each other in a direction of the side edges, and each having the same strip shape as that of each of the fuel electrodes and a plurality of wall parts between the plurality of slits; respectively overlapping the first and second solid electrolyte tapes with lower and upper sides of the first support to allow the plurality of fuel electrodes to face each other within the plurality of slits of the first support, and overlapping the second support with a lower side of the first or second solid electrolyte tape overlapping with the lower side of the first support to allow the slits of the second support to be disposed perpendicular to the silts of the first support, thereby forming a unit module; stacking and integrating at least one or more unit modules to manufacture a module; cutting end edges of the second support to open the plurality of slits of the second support in the module, thereby respectively forming a plurality of air paths and a plurality of air electrodes within the plurality of air paths; cutting end edges of the first support to open the plurality of slits of the first support in the module, thereby forming fuel paths including the plurality of fuel electrodes; forming a connection electrode connected to each of the plurality of air electrodes and a connection electrode connected to each of the plurality of fuel electrodes and forming module connection electrodes on top and bottom surfaces of the module to respectively connect the connection electrodes to the module connection electrodes; and thermally treating the module. The at least one or more unit modules in the manufacturing of the module may be attached using a binder and integrated with each other by being thermally bonded at a softening temperature of the binder. The manufacturing of the module may further include sintering the integrated module for densification. The sintering temperature may range from about 1,350° C. to about 1,450° C. The plurality of air electrodes in the forming of the plurality of air electrodes may be formed on the entire inner surfaces of the plurality of air paths by dipping the module having the plurality of air paths into electrode slurry. Each of the first and second solid electrolyte tapes may be formed of at least one composition selected from a group consisting of yttria-stabilized zirconia, calcia-stabilized zirconia, magnesia-stabilized zirconia, and lanthanum gallate. Each of the first and second solid electrolyte tapes may be formed by being cast using a doctor blade. Each of the first and second solid electrolyte tapes may have a thickness of about 10 µm to about 30 µm. Each of the first and second supports may be formed of at least one composition of zirconia-based yttria partially-stabilized zirconia and zirconia-based calcia partially-stabilized zirconia. Each of the first and second support may have a thickness of about 50 µm to about 200 µm. Each of the slits may have a width of about 0.5 mm to about 1 mm. Each of the fuel electrodes may be formed of a composition in which a volume ratio of nickel oxide and yttria-stabilized zirconia is about 6:4 and about 25 volume % of graphite is added. Each of the air electrodes may be formed of at least one composition of lanthanum strontium manganite and samarium strontium cobaltate. The composition of each of the fuel electrodes may further contain stabilized zirconia powder. The content of the stabilized zirconia powder may be about 20 weight % to about 40 weight %. Each of the connection electrodes and module connection electrodes may be formed of an Ag—Pd— or Ag—Pt— based composition. The module connection electrodes in the forming of the module connection electrodes may be formed into an X-shaped pattern. The thermal treatment process in the thermally treating of the module may be performed at a temperature of about 1,150° C. to about 1,250° C.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, the present disclosure will be described in detail with reference to accompanying drawings.

Figure 1:
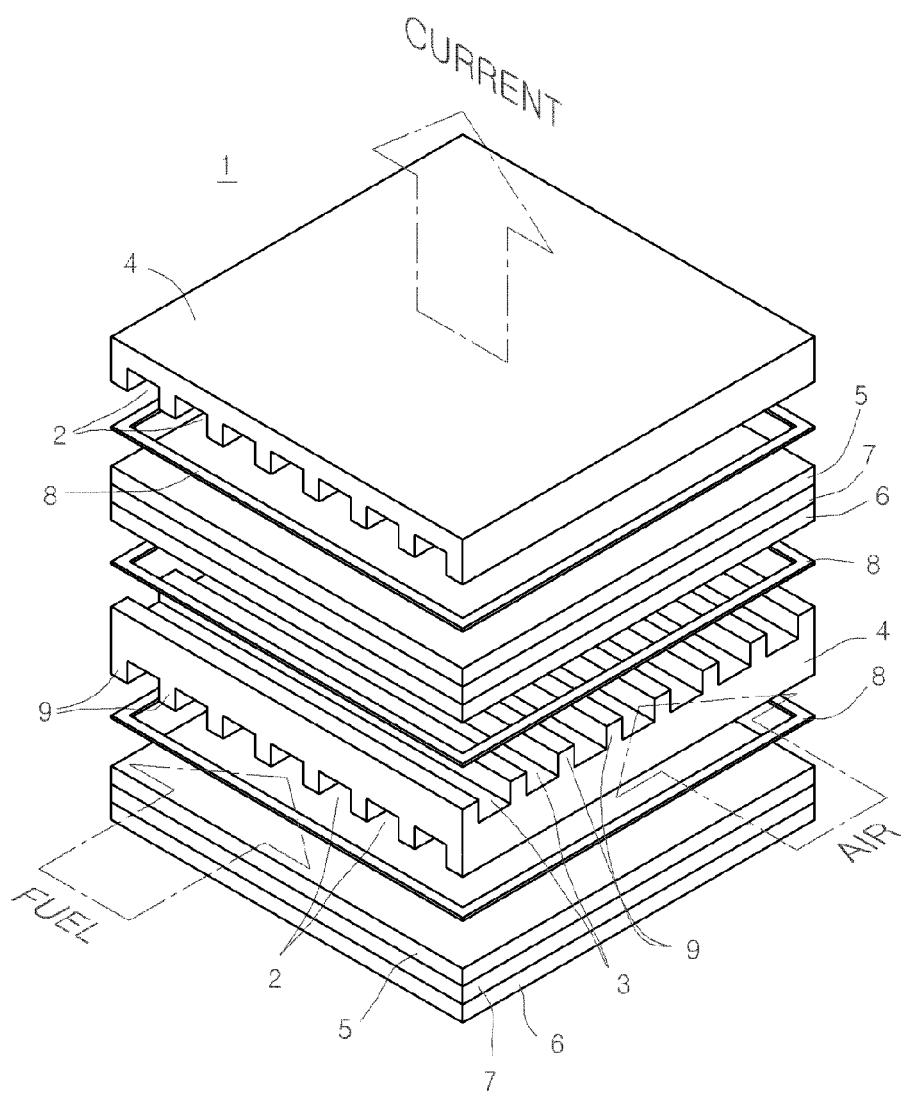
FIG. 1 is an exploded perspective view of a related art solid oxide fuel cell (SOFC)
Figure 2:
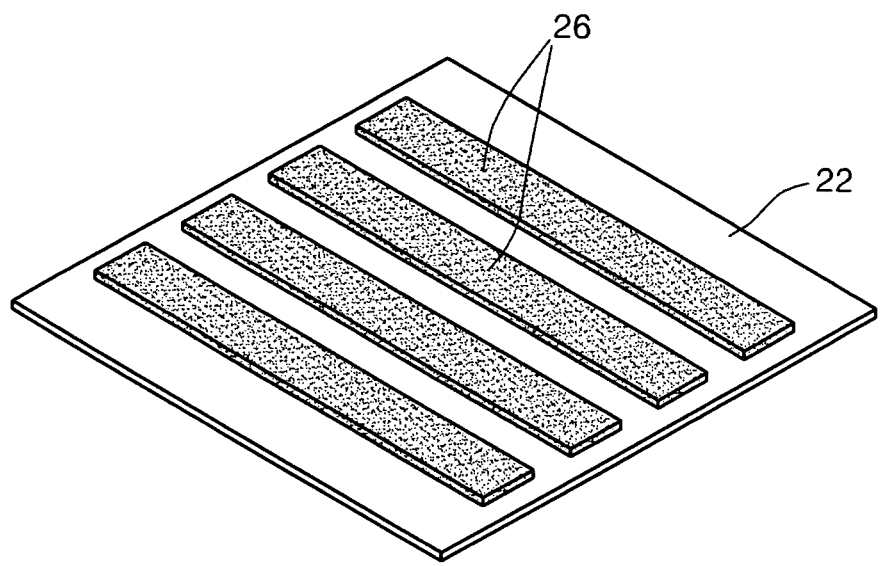
FIG. 2 is a perspective view of a solid electrolyte tape that is a basic element of a SOFC according to an embodiment.
Figure 3:
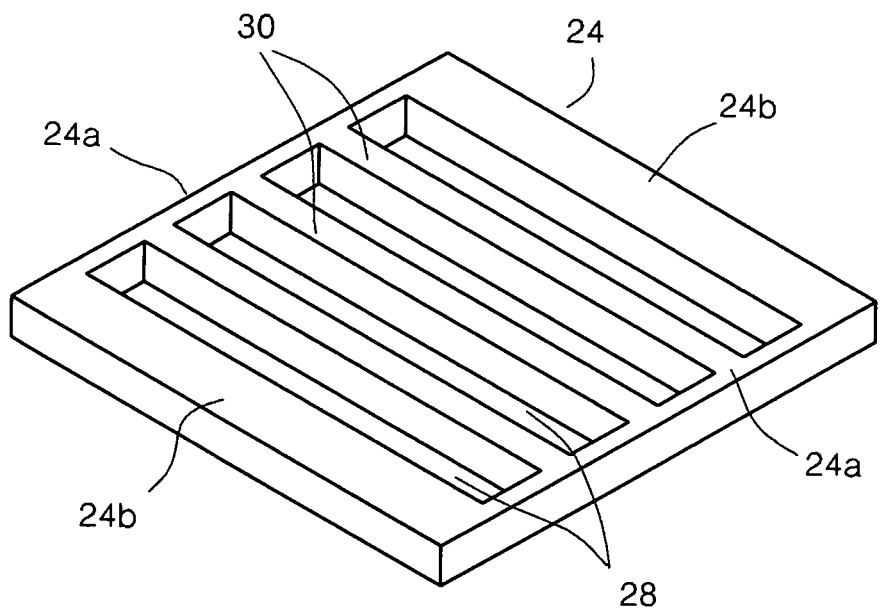
FIG. 3 is a perspective view of a support that is a basic element of the SOFC according to an embodiment.

FIG. 2 is a perspective view of a solid electrolyte tape that is a basic element of a SOFC according to an embodiment, and FIG. 3 is a perspective view of a support that is a basic element of the SOFC according to an embodiment.

Figure 18:
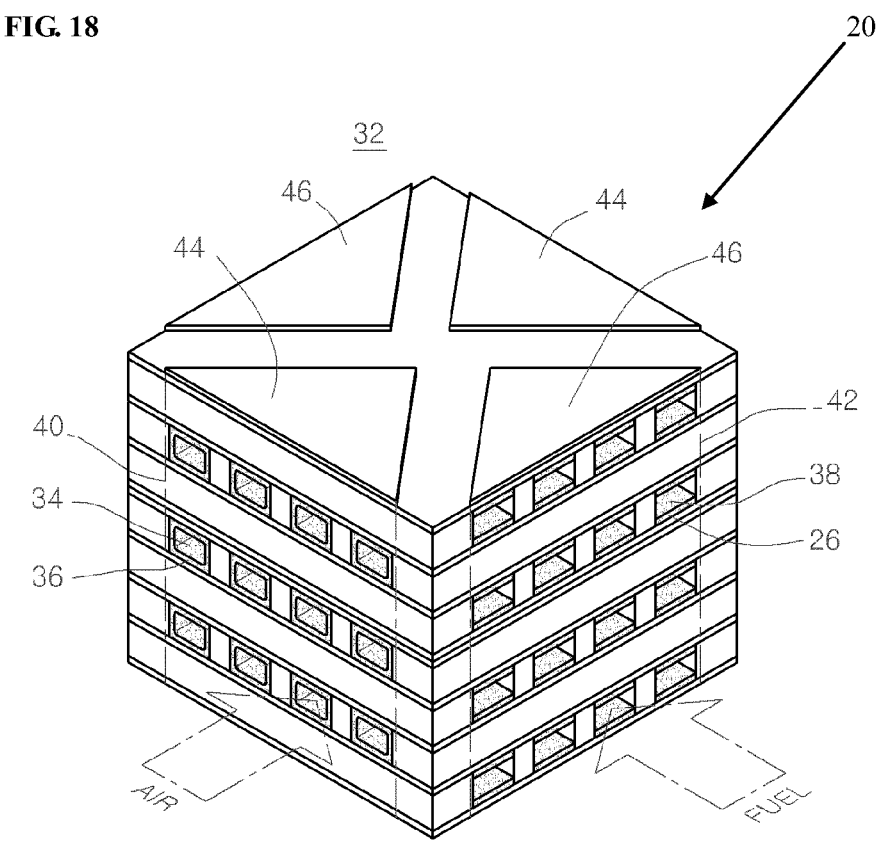
FIG. 18 is a perspective view illustrating a fuel cell stacked structure of a multi-stacked structure.

Referring to FIGS. 2 and 3, a solid oxide fuel cell (SOFC) 20, per shown in FIG. 18, according to an embodiment has the form of a stacked structure of a plurality of predetermined modules which comprise a solid electrolyte tape 22 including a plurality of electrode layers and supports 24 defining a fuel or air path and being stacked above and below the solid electrolyte tape 22 respectively to support the solid electrolyte tape 22.

In the solid electrolyte tape 22 constituting the SOFC according to an embodiment, a plurality of fuel electrodes 26 is spaced a predetermined distance from each other in a strip shape only on one side surface of the solid electrolyte tape 22. Here, each of the fuel electrodes 26, each having the strip shape, has a shape in which both ends thereof do not extend up to the edges of the solid electrolyte tape 22. Also, the solid electrolyte tape 22 may be formed of at least one selected from a group having good ion conductivity consisting of yttria-stabilized zirconia (8 mol % $Y_2O_3$—$ZrO_2$; YSZ), calcia or magnesia-stabilized zirconia (13 mol % CaO—$ZrO_2$; CSZ or 18 mol % MgO—$ZrO_2$; MSZ), and lanthanum gallate ($LaGaO_3$; LGO). Preferably, the solid electrolyte tape 22 may be formed of yttria-stabilized zirconia (8 mol % $Y_2O_3$—$ZrO_2$; YSZ). Also, for manufacturing the solid electrolyte tape 22, a binder (e.g. PVB or acrylic) and/or a dispersion (e.g. BYK-111 or BYK-180) are(is) added to the above-described composition, which are then uniformly dispersed in a solvent (e.g., a mixed solution of toluene and ethanol) and formed into a tape shape by a typical method including a doctor blade method. Such a tape may be formed by casting at a rate of about 5 m/min and drying at a temperature of about 80° C. In addition, the solid electrolyte tape 22 may have a thickness of about 10 μm to about 30 μm preferably. Here, when the solid electrolyte tape 22 has a thickness less than the foregoing thickness, the solid electrolyte tape 22 may have a low strength which leads to the damage during the manufacture and the use thereof. Also, when the solid electrolyte tape 22 has a thickness greater than the foregoing thickness, its electrical conductivity may be reduced to result in the deteriorated properties.

The fuel electrodes 26 disposed on a side surface of the solid electrolyte tape 22 perform a reduction reaction of the fuel gas. In addition, the fuel electrodes 26 should maintain porosity for conductivity and gas permeation. Preferably, each of the fuel electrodes 26 may have a composition in which a volume ratio of nickel oxide and yttria-stabilized zirconia (YSZ) is about 6:4 and about 25 volume % of graphite is added for porosity, but the present disclosure is not limited thereto and any electrode materials known in the art may be used. The composition of the fuel electrode 26 may be manufactured in a paste shape using the binder together with the solvent, and then printed on a side surface of the solid electrolyte tape 22 in a plurality of strip pattern shapes. Here, as described below, the plurality of strip patterns should correspond to patterns of the fuel path 28.

The supports 24 are vertically stacked on top and bottom surfaces of the solid electrolyte tape 22 and prepared to form the fuel or air path. For example, each of the supports 24 has a square shape. Also, since the support 24 is divided by a wall part 30, the support 24 includes a plurality of slits for forming the plurality of fuel or air paths. Each of the vertically communicating slits 28 has both ends respectively adjacent to both end edges 24a of the support 24 and is disposed parallel to side edges 24b. Here, the term "end edge 24a" represents two side edges of ends facing each other of each of slits 28 in the support 24 having a plate shape. Also, the term "side edge 24b" represents two side edges facing each other and parallel to lateral parts of each of the slits 28 in the support 24 having a square shape. Thus, the slits 28 disposed parallel to each other at a certain distance is surrounded and blocked by the two end edges 24a and two side edges 24b of the support 24. However, the end edges 24a or the side edges 24b are removed as described below, so that the plurality of slits 28 forms the fuel path or the air path, respectively.

Also, since the support 24 supports the solid electrolyte tape 22 and has the fuel path or the air path, the support 24 preferably may have a similar composition to that of the solid electrolyte tape 22 so that the support 24 and solid electrolyte tape 22 both may have similar thermal expansion coefficient and a sintering temperature. Thus, similar to the composition of the above-described solid electrolyte tape 22, the support 24 may be formed of at least one of zirconia-based yttria partially-stabilized zirconia (3 mol % $Y_2O_3$—$ZrO_2$; PSZ) and zirconia-based calcia partially-stabilized zirconia (6 mol % CaO—$ZrO_2$; PSZ), but is not limited thereto and any material known in the art with a thermal expansion coefficient and a sintering temperature similar to those of the solid electrolyte tape 22 may also be used. Also, the composition may be manufactured in a tape or plate shape using slurry like the solid electrolyte tape 22. Here, the manufactured support 24 may have a thickness of about 50 μm to about 200 μm which secures a predetermined strength to sufficiently perform a function as a support and allows the fuel or air path to be easily formed. Also, the plurality of slits 28 forming the fuel or air path may have openings of strip shapes by punching the manufactured support 24 by a predetermined distance. Here, each of the plurality of slits 28 may have a width of about 0.5 nm to about 1 mm. The distance of the slit 28, i.e., a width of the wall part 30 also may be equal to the width of the slit 28 to maintain a predetermined strength.

Also, as described below, the air electrode may be manufactured through a process in which the solid electrolyte tape 22 and the support 24 are stacked to form the fuel cell according to the present disclosure.

FIGS. 4 to 19 are views illustrating a process of manufacturing a SOFC according to the present disclosure. Hereinafter, a structure of the SOFC 20 and a method of manufacturing the same will be described with reference to the accompanying drawings.

As described above, a solid electrolyte tape 22 including a plurality of fuel electrodes 26 each having a strip shape and a support 24 in which a plurality of slits 28 is formed are prepared on one surface shown in FIG. 2. The number of the solid electrolyte tape 22 and the support 24 depends on a design of the fuel cell.

Figure 4:
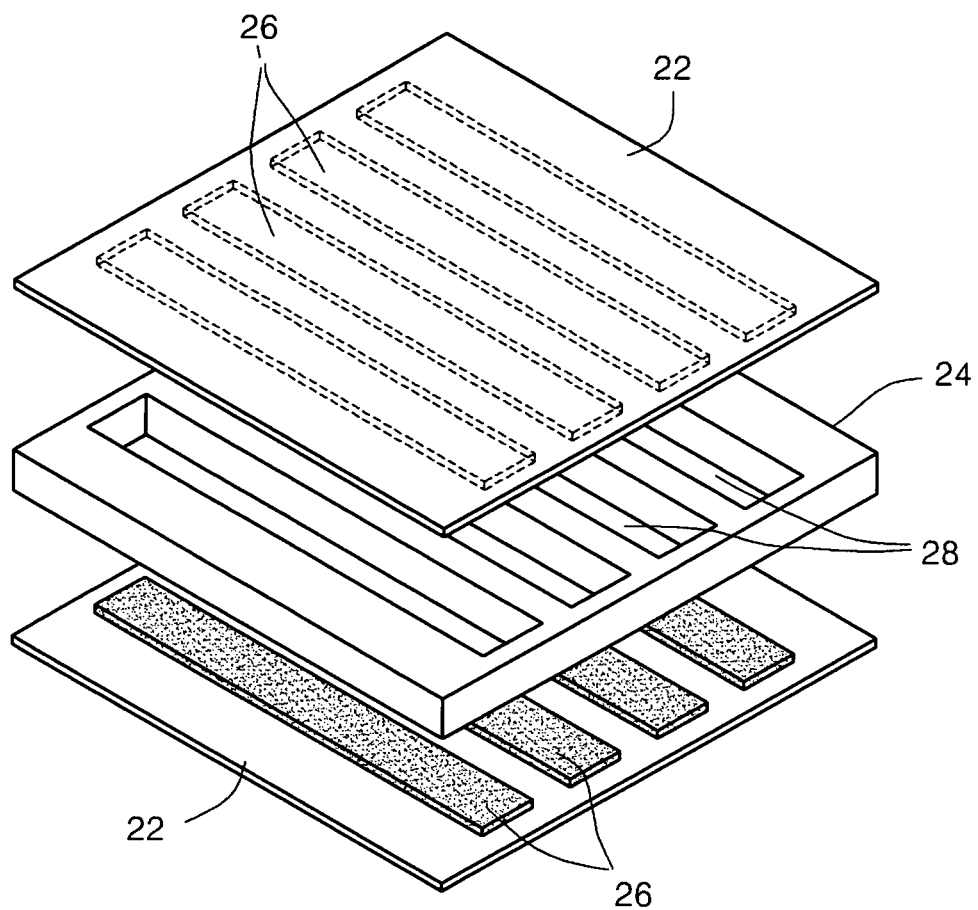
FIG. 4 is a perspective view illustrating a process in which the solid electrolyte tape is disposed overlapping with lower and upper sides of the support.
Figure 5:
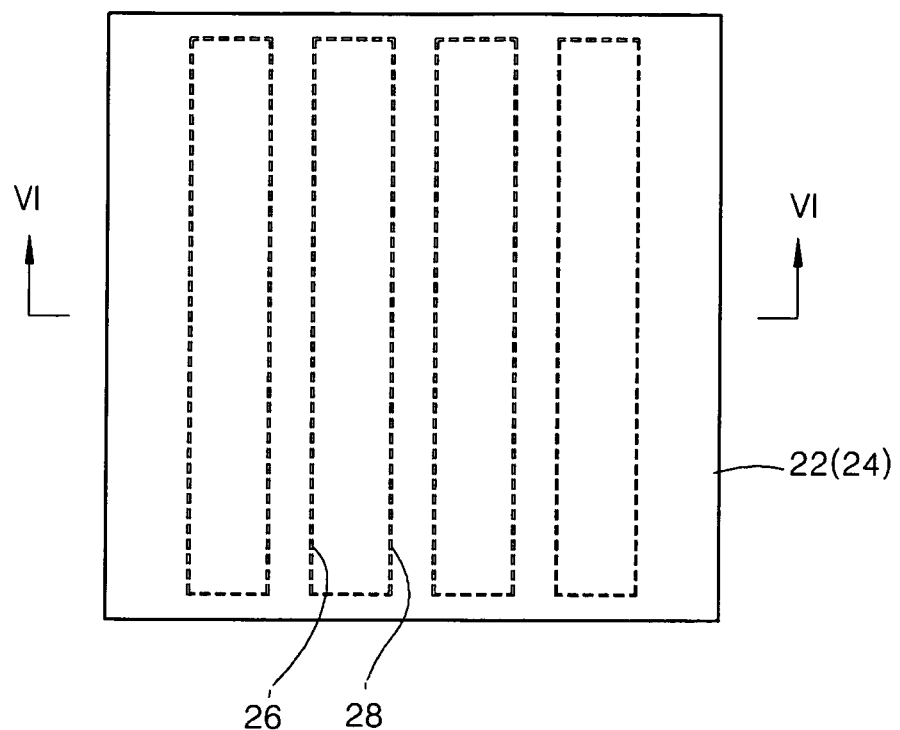
FIG. 5 is a plan view of a structure in which the solid electrolyte tape is disposed overlapping with the lower and upper sides of the support.
Figure 6:
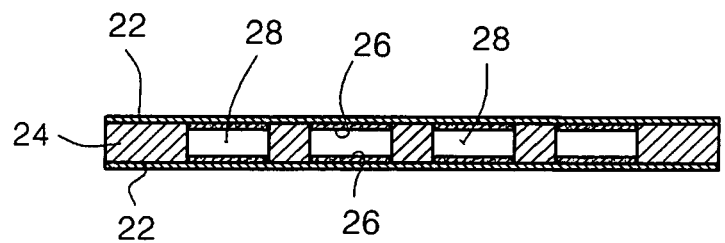
FIG. 6 is a sectional view taken along line VI-VI of FIG. 5.

Referring to FIG. 4, a first support 24 is disposed on a first solid electrolyte tape 22 where a plurality of fuel electrodes 26 is facing upward so that the plurality of slits 28 is oriented in accordance with the direction of the fuel electrodes. Also, a second solid electrolyte tape 22 is disposed on the first support 24 so that the fuel electrodes 26 are disposed downward in accordance with the direction of the slits 28 of the first support 24. Thus, the first and second solid electrolyte tapes 22 are disposed overlapping with each other on top and bottom surfaces of the first support 24, respectively. Also, the fuel electrodes 26 disposed on a top surface of the lower first solid electrolyte tape 22 are disposed on under surfaces of the slits 28 of the first support 24, respectively. In addition, the fuel electrodes 26 disposed on a lower surface of the upper second solid electrolyte tape 22 are disposed on top surfaces of the slits 28 of the first support 24, respectively. Accordingly, the upper and lower fuel electrodes 26 face each other within each of the slits 28. The first support 24 serves as a support 24 for forming fuel paths because the plurality of slits 28 constitutes the fuel paths in a post-process.

Figure 7:
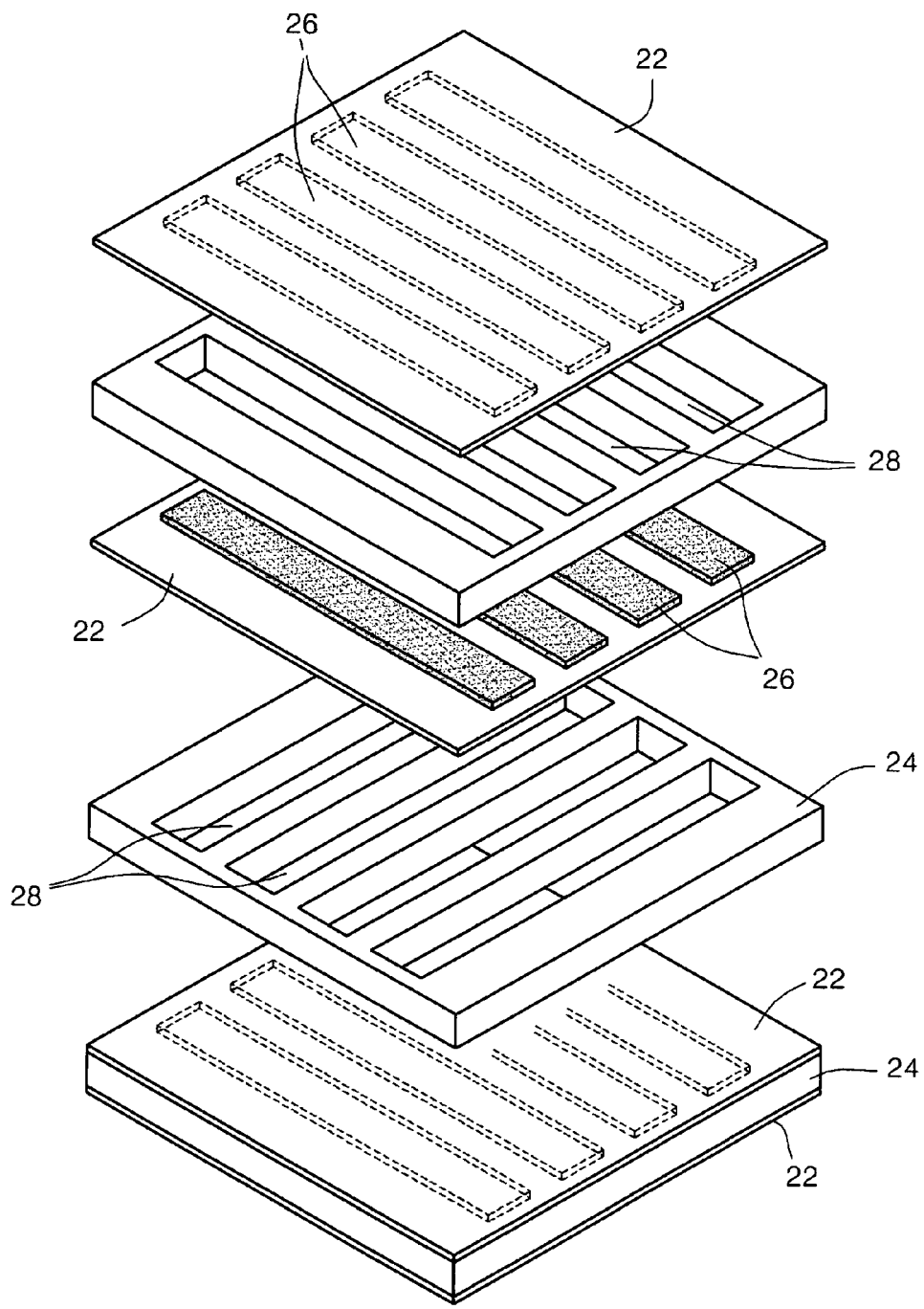
FIG. 7 is a perspective view illustrating a process of stacking a stacked structure as a basic element.
Figure 8:
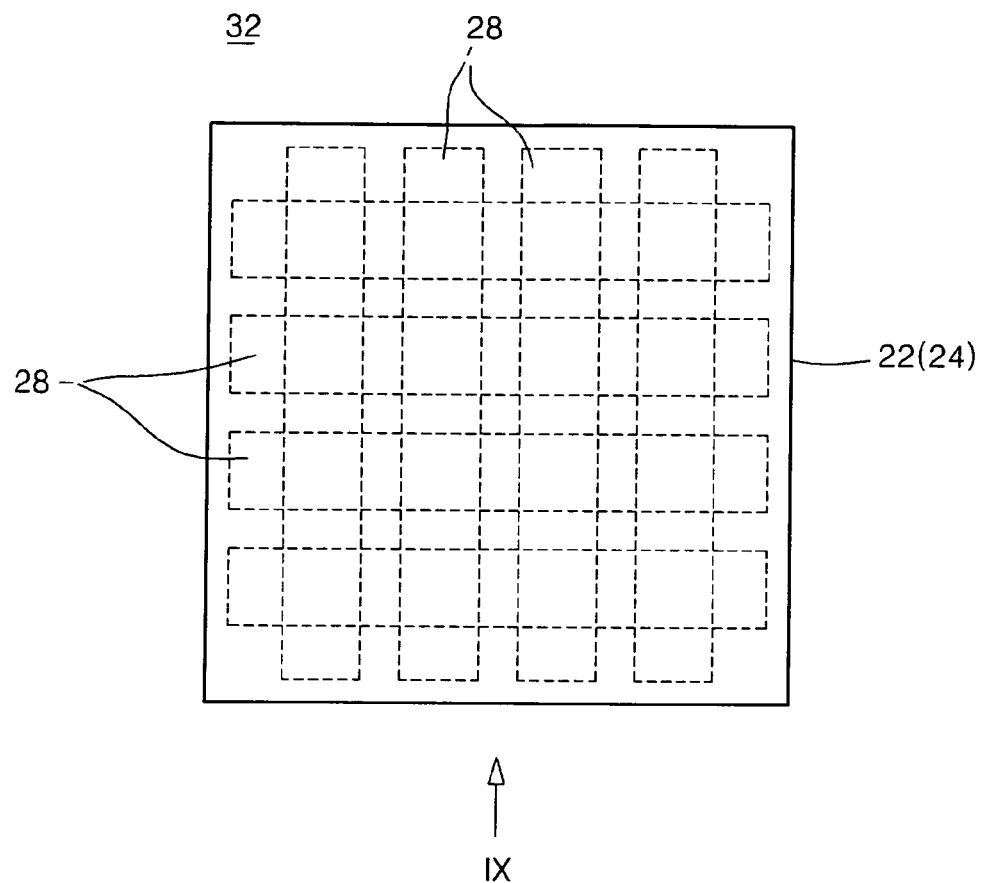
FIG. 8 is a plan view of the stacked structure stacked as shown in FIG. 7 and illustrates a structure in which the slits of the support are perpendicular to each other.
Figure 9:
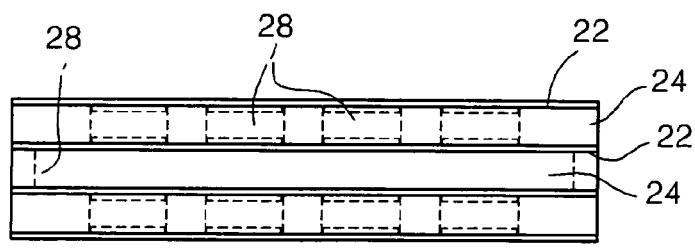
FIG. 9 is a front view when viewed from an arrow IX direction of FIG. 8.
Figure 10:
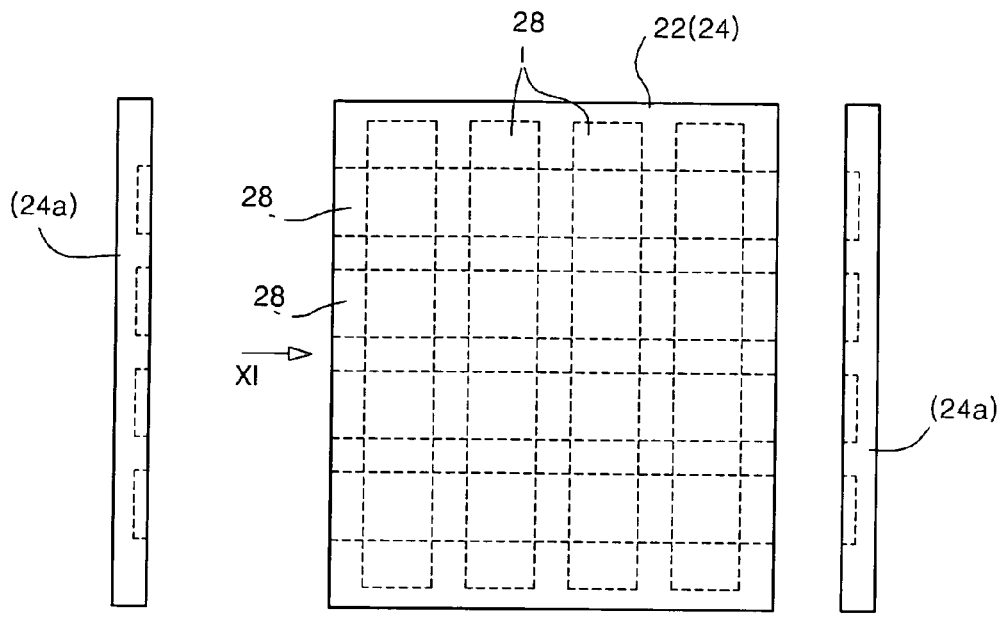
FIG. 10 is a plan view for explaining a process in which a structure of a unit cell is completed based on the stacked structure and illustrating a structure in which both side parts of the support of the stacked structure are cut to open an air path and form an air electrode within the air path.
Figure 11:
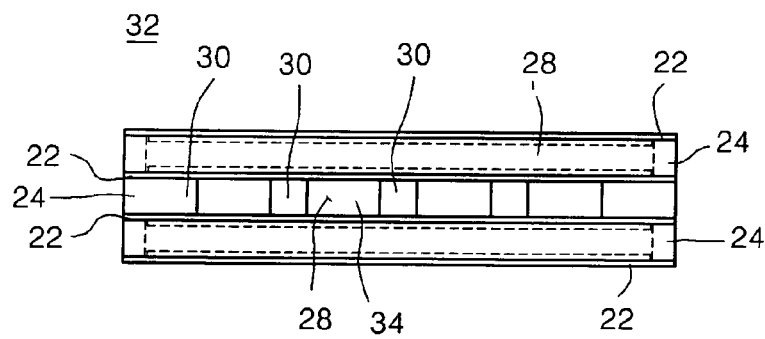
FIG. 11 is a front view when viewed from an arrow XI direction of FIG. 10.
Figure 12:
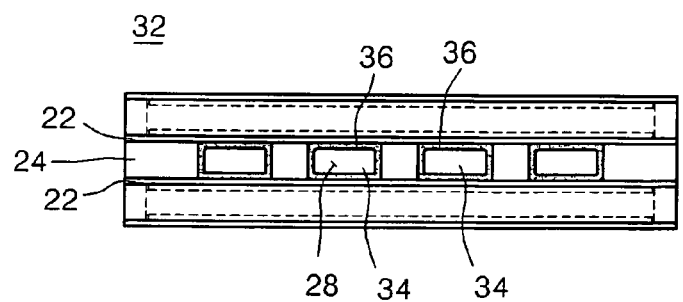
FIG. 12 is a front view similar to that of FIG. 11, which illustrates the structure in which the air electrode is formed within the air path.
Figure 13:
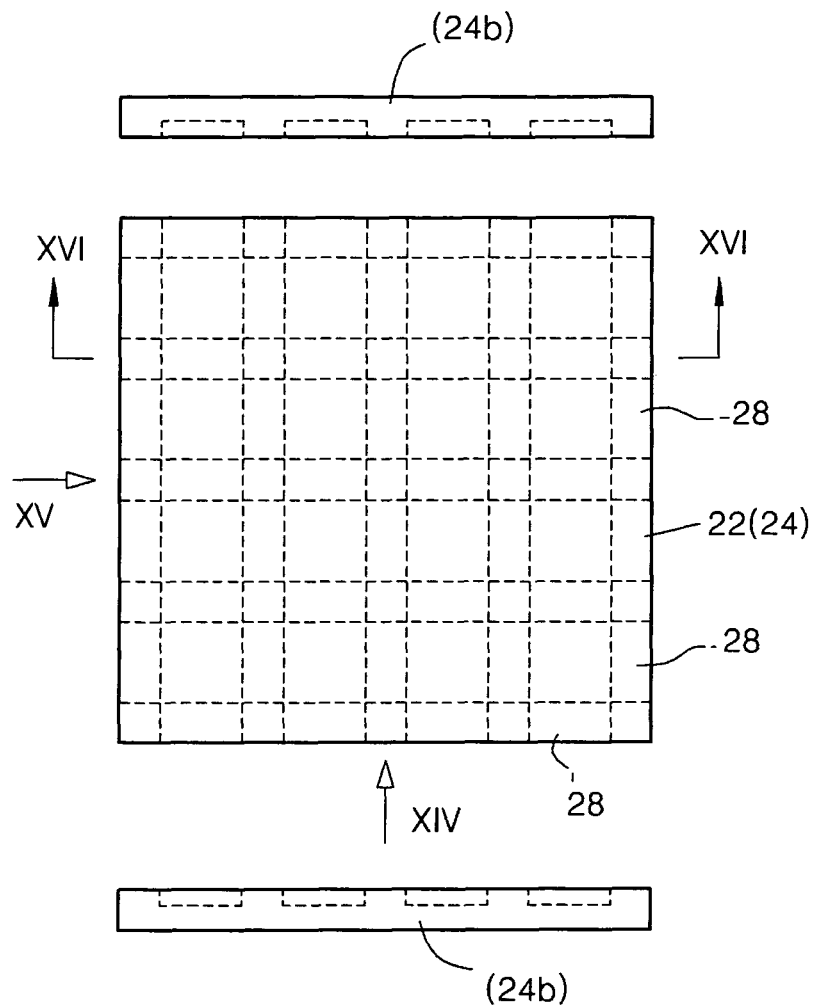
FIG. 13 is a plan view of a structure in which the end parts of both sides of the support are cut to open a fuel path.
Figure 14:
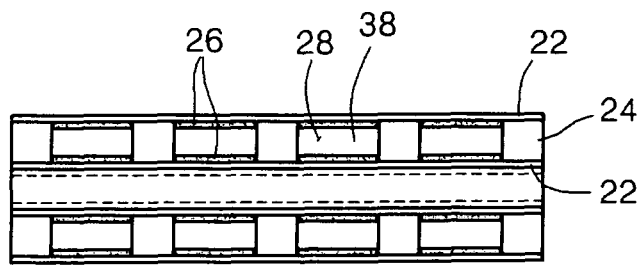
FIG. 14 is a front view when viewed from an arrow XIV direction of FIG. 13.
Figure 15:
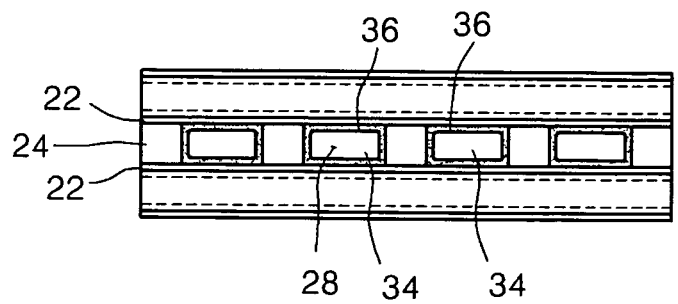
FIG. 15 is a front view when viewed from an arrow XV direction of FIG. 13.
Figure 16:
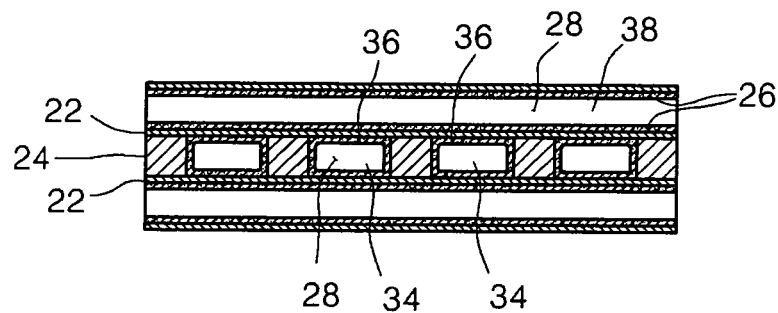
FIG. 16 is a sectional view taken along line XVI-XVI of FIG. 13.
Figure 17:
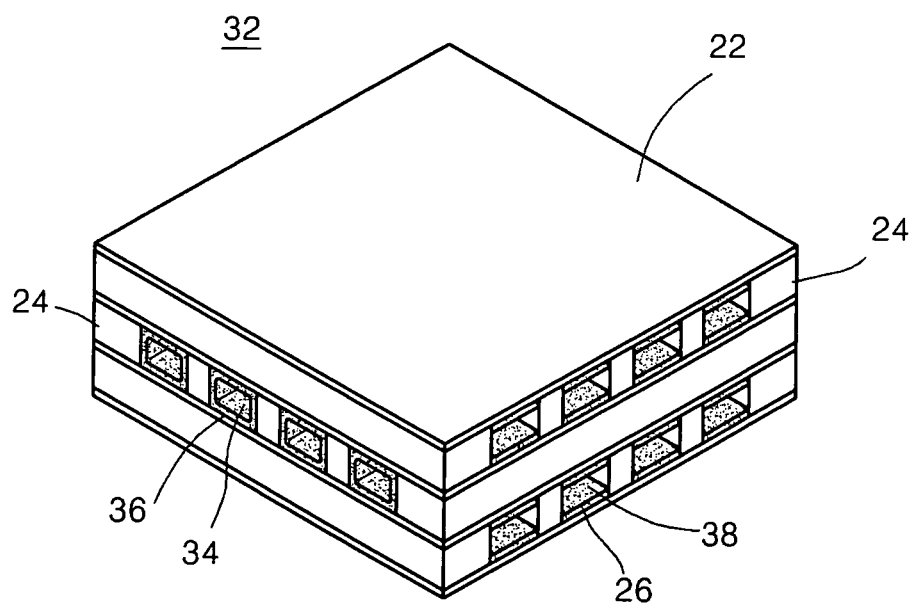
FIG. 17 is a perspective view of the staked structure.

Also, as described above, in a structure in which the first and second solid electrolyte tapes 22 are disposed overlapping with each other on the top and bottom surfaces of the first support 24, as shown in FIG. 7, a second support 24 on which the slits 28 of the second support 24 are rotated by about 90° with respect to the slits 28 of the first support 24 and thus disposed in a direction perpendicular to those the slits 28 of the first support 24. The second support 24 serves as a support 24 for forming fuel paths in a post-process.

The structure in which the first and second solid electrolyte tapes 24 are disposed overlapping with each other on the top and bottom surfaces of the first support 24 is repeatedly stacked on the second support 24 to form a stacked structure 32. Like the above-described structure, the slits 28 of the second support 24 and the slits 28 of the first support 24 are stacked perpendicular to each other. Thus, the first support 24 on which the first and second solid electrolyte tapes 24 overlap with each other on the top and bottom surfaces thereof, the second support 24 overlapping with the first support 24, and the stacked structure 32 on which the first support 24 including the first and second solid electrolyte tapes 24 overlapping with each other is stacked may be jointed with each other using a predetermined binder. Any compositions known in the corresponding fields may be used as the binder. For example, the binder may be thermally bonded by applying a pressure of about 40 kg/cm$^2$ to about 70 kg/cm$^2$ at a temperature of about 60° C. to about 80° C. at which the binder is softened to integrate the first support 24, the second support 24, and the stacked structure 32 with each other. The integrated stacked structure 32 may be sintered at a temperature of about 1,340° C. to about 1,450° C. to manufacture a dense solid electrolyte stacked module. Here, an increasing temperature and a cooling speed may be set as slowly as possible (e.g., about 5° C./min or less) to prevent the stacked structure from being cracked and deformed. Also, a boiling temperature region (e.g., a range from about 400° C. to about 600° C.) of the binder may be set to a long time (e.g., 6 hours or more) to sufficiently burn out the binder.

Also, in the process of manufacturing the dense integrated solid electrolyte stacked module, each of the slits 28 of each of the supports 24 may be maintained in a state in which ends thereof are closed. However, in the stacked structure 32, end edges 24a of the second support 24 are subsequently cut to open both ends of the slits 28, thereby forming the air paths. Here, since the slits 28 of the second support 24 are perpendicular to the slits 28 of the first support 24, only side edges 24b of the first support 24 are cut in the stacked structure 32 while the end edges 24a of the second support 24 are cut. Thus, the slits 28 of the first support 24 are not opened (see FIG. 10). That is, the end edges 24a of the second support 24 are cut in the stacked structure 32 to open the plurality of slits 28, thereby forming the plurality of air paths 34. The plurality of air paths 34 are defined by the region of the inner surfaces of both wall parts 30 which constitute the slits 28 of the second support 24 and the solid electrolyte tape 22 which is disposed overlapping with the upper and lower slits 28.

Also, as described below, air electrodes (reference numeral 36 of FIG. 12) are formed on the inner surfaces of both wall parts 30 defining the air paths 34 in the slits 28 and in the region of the upper and lower solid electrolyte tapes 22. The air electrodes 36 are electrodes for oxidizing air or oxygen gas, which is injected and flows in the air electrodes 36. Thus, like the fuel electrodes 26, each of the air electrodes 36 should have conductivity and porosity for gas permeation. The air electrode 36 may be formed of one of lanthanum strontium manganite (LaSrMnO3; LSM) and samarium strontium cobaltate (SmSrCoO3; SSC). In addition, about 20 weight % to about 40 weight % of yttria-stabilized zirconia (YSZ) may be added to improve an adhesion strength with the solid electrolyte. Also, for example, such composition powder may be manufactured as slurry where the powder with the addition of a binder and/or dispersion are dispersed in a solvent and thus may be printed as the air electrodes 36. Also, alternatively, the end edges 24a of the second support 24 are cut to form the air electrodes 36 on the entire inner surfaces of the air paths 34 using a method in which the stacked structure 32 in which the air paths 34 are opened in the second support 24 (however, the slits 28 of the first support 24 are not opened) is dipped into the air electrode slurry. Preferably, a layer having a thickness of about 5 μm or less may be stacked two to three times to form each of the air electrodes 36. Therefore, the slits 28 are opened to form the air paths 34 and the air electrodes 36 (see FIG. 12) in the second support 24.

The air electrodes 36 are electrically connected to each other through connection electrodes for collecting electricity. Each of the connection electrodes may be formed of any electrode composition known in corresponding fields, and for example, Ag—Pd or Ag—Pt-based electrode may be dipped with a predetermined depth to form the connection electrodes. The connection electrodes will be described with reference to FIG. 18.

As described above, the slits 28 are opened in the second support 24 to form the air paths 34. After the air electrodes 36 are formed on the air paths 34, the fuel paths perpendicular to the air paths 34 are formed. For this, the end edges 24a of the first support 24 are cut in the stacked structure 32 to open both ends of the slits 28, thereby forming the fuel paths (see FIG. 13). Also, since fuel electrodes 26 of the first and the second solid electrolyte tapes 22 are previously disposed facing each other on lower and upper sides of the slits 28 in the first support 24, the fuel paths 38 including the fuel electrodes 26 may be formed only by opening of the slits 28 in the first support 24 (See FIG. 14).

Thereafter, the connection electrodes are connected between the fuel electrodes 26 to collect electricity. As described above, the connection electrodes may be manufactured using the same composition and method as those of the air electrodes 36.

As described above, although the stacked structure 32 in which the air paths 34 including the air electrodes 36 and the fuel paths 38 including the fuel electrodes 26 are formed is described as a stacked structure of a unit cell for convenience in describing the drawings, it will be understood by those of ordinary skill in the art that the stacked structure may have a multi-stacked structure according to a design. For example, FIG. 18 is a view of a SOFC module having a multi-stacked structure. Here, a connection electrode 40 connected to each of air electrodes 36 and a connection electrode 42 connected to each of fuel electrodes 26 are schematically illustrated. Such SOFC modules may be connected in series or parallel to each other to easily vary cell capacity. For this, the connection between the modules should be simplified. Thus, in order to establish electrical connection through contacts between the upper and lower modules of the SOFC modules, the module connection electrodes 44 and 46 may be formed into an X-shaped pattern at a predetermined distance so that they do not contact each other. Also, the connection electrode connected to the air electrode 36 may be connected to the module connection electrode 44, and the connection electrode 42 connected to the fuel electrode 26 may be connected to the module connection electrode 46. Each of the module connection electrodes 44 and 46 may be formed of any electrode composition previously known in the field and may be printed, for example, in Ag—Pd or Ag—Pt-based composition.

Also, as described above, the stacked structure module of the SOFC in which each of the connection electrodes 40 and 42 is respectively connected to each of the module connection electrodes 44 and 46 may be thermally treated at a temperature of about 1,150° C. to about 1,250° C. (e.g., for about one hour to about three hours) to complete the integrated SOFC according to the present disclosure.

As described above, the SOFC according to the present disclosure may have following advantages:

1) Since the assembly members such as the separation plate, the connection member, and the sealing member are not used, a capacity per unit volume may be significantly improved to realize a small-sized and lightweight fuel cell. Thus, in case where the fuel cell is used as a portable fuel cell, efficiency thereof may be significantly improved.

2) Since materials having properties similar to each other are integrated without using the assembly members such as the separation plate, the connection member, and the sealing member, the reliability and life-cycle of the fuel cell may be significantly improved.

3) Since the assembly members such as the separation plate, the connection member, and the sealing member are not used, manufacturing costs may be significantly reduced without unnecessarily increasing manufacturing and assembly costs.

4) The integrated SOFC may be modulated, and also the components thereof may be connected to each other to easily vary the cell capacity.

Although the solid oxide fuel cells and the method of manufacturing the same have been described with reference to the specific embodiments, it(they) is(are) not limited thereto. Therefore, it will be readily understood by those skilled in the art that various modifications and changes can be made thereto without departing from the spirit and scope of the present invention defined by the appended claims.

What is claimed is:

1. A solid oxide fuel cell in which at least one or more predetermined unit modules are stacked and integrated with each other, the solid oxide fuel cell comprising:
    first and second solid electrolyte layers (22) in which each of the unit modules comprises a plurality of fuel electrodes (26) spaced a predetermined distance from each other and each having a strip shape on a surface thereof; and
    first and second supports (24) each comprising a plurality of slits (28) each having the same strip shape as that of each of the fuel electrodes (26),
    wherein the first and second solid electrolyte layers (22) overlap with each other on lower and upper sides of the first support (24) to allow the plurality of fuel electrodes (26) to face each other within the plurality of slits (28) of the first support (24), and the second support (24) overlaps with a lower side of the first or second solid electrolyte layer (22) overlapping with the lower side of the first support (24) to allow the slits (28) of the second support (24) to be disposed perpendicular to the slits (28) of the first support (24), wherein the slits (28) of the first support (24) define fuel paths (38) comprising the fuel electrodes (26), and the slits (28) of the second support (24) define air paths (34) comprising air electrodes (36).

2. A method of manufacturing a solid oxide fuel cell, the method comprising:
    respectively preparing first and second solid electrolyte tapes in which a plurality of fuel electrodes each having a strip shape is formed on a surface thereof;
    respectively preparing first and second supports each comprising a plurality of silts slits having end edges and side edges, each vertically communicating in parallel at distances spaced from each other in a direction of the side edges, and each having the same strip shape as that of each of the fuel electrodes and a plurality of wall parts between the plurality of slits;
    respectively overlapping the first and second solid electrolyte tapes with lower and upper sides of the first support to allow the plurality of fuel electrodes to face each other within the plurality of slits of the first support, and overlapping the second support with a lower side of the first or second solid electrolyte tape overlapping with the lower side of the first support to allow the slits of the second support to be disposed perpendicular to the slits of the first support, thereby forming a unit module;
    stacking and integrating at least one or more unit modules to manufacture a module;
    cutting end edges of the second support to open the plurality of slits of the second support in the module, thereby respectively forming a plurality of air paths and a plurality of air electrodes within the plurality of air paths;
    cutting end edges of the first support to open the plurality of slits of the first support in the module, thereby forming fuel paths comprising the plurality of fuel electrodes;
    forming a connection electrode connected to each of the plurality of air electrodes and a connection electrode connected to each of the plurality of fuel electrodes and forming module connection electrodes on top and bottom surfaces of the module to respectively connect the connection electrodes to the module connection electrodes; and thermally treating the module.

3. The method of claim 2, wherein the at least one or more unit modules in the manufacturing of the module are attached using a binder and integrated with each other by being thermally bonded at a softening temperature of the binder.

4. The method of claim 2, wherein the manufacturing of the module further comprises sintering the integrated module for densification.

5. The method of claim 4, wherein the sintering temperature ranges from about 1,350° C. to about 1,450° C.

6. The method of claim 2, wherein the plurality of air electrodes in the forming of the plurality of air electrodes is formed on the entire inner surfaces of the plurality of air paths by dipping the module having the plurality of air paths into electrode slurry.

7. The method of claim 2, wherein each of the first and second solid electrolyte tapes is formed of at least one composition selected from a group consisting of yttria-stabilized zirconia, calcia-stabilized zirconia, magnesia-stabilized zirconia, and lanthanum gallate.

8. The method of claim 2, wherein each of the first and second solid electrolyte tapes is formed by being cast using a doctor blade.

9. The method of claim 2, wherein each of the first and second solid electrolyte tapes has a thickness of about 10 μm to about 30 μm.

10. The method of claim 2, wherein each of the first and second supports is formed of at least one composition of zirconia-based yttria partially-stabilized zirconia and zirconia-based calcia partially-stabilized zirconia.

11. The method of claim 2, wherein each of the first and second support has a thickness of about 50 μm to about 200 μm.

12. The method of claim 2, wherein each of the slits has a width of about 0.5 mm to about 1 mm.

13. The method of claim 2, wherein each of the fuel electrodes is formed of a composition in which a volume ratio of nickel oxide and yttria-stabilized zirconia is about 6:4 and about 24 volume % of graphite is added.

14. The method of claim 2, wherein each of the air electrodes is formed of at least one composition of lanthanum strontium manganite and samarium strontium cobaltate.

15. The method of claim 14, wherein the composition of each of the fuel electrodes further contains stabilized zirconia powder.

16. The method of claim 15, wherein the content of the stabilized zirconia powder is about 20 weight % to about 40 weight %.

17. The method of claim 2, wherein each of the connection electrodes and module connection electrodes is formed of an Ag—Pd— or Ag—Pt-based composition.

18. The method of claim 2, wherein the module connection electrodes in the forming of the module connection electrodes are formed into an X-shaped pattern.

19. The method of claim 2, wherein the thermal treatment process in the thermally treating of the module is performed at a temperature of about 1,150° C. to about 1,250° C.

* * * * *